United States Patent
O'Day et al.

(10) Patent No.: US 7,932,684 B2
(45) Date of Patent: Apr. 26, 2011

(54) ABSOLUTE POSITION SENSING

(75) Inventors: Richard O'Day, Westborough, MA (US); Antonio Sangermano, II, Rindge, NH (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 12/731,690

(22) Filed: Mar. 25, 2010

(65) Prior Publication Data

US 2010/0176806 A1 Jul. 15, 2010

Related U.S. Application Data

(63) Continuation-in-part of application No. 12/055,283, filed on Mar. 25, 2008, now Pat. No. 7,804,210, and a continuation-in-part of application No. 12/055,280, filed on Mar. 25, 2008.

(60) Provisional application No. 61/234,508, filed on Aug. 17, 2009.

(51) Int. Cl.
*H02K 41/00* (2006.01)
(52) U.S. Cl. .................. 318/135; 318/34; 318/558
(58) Field of Classification Search .......... 318/135, 318/34, 558, 687, 490; 310/156.36, 156.38, 310/101
See application file for complete search history.

(56) References Cited

U.S. PATENT DOCUMENTS

| | | | |
|---|---|---|---|
| 4,981,309 A | 1/1991 | Froeschle et al. | |
| 5,130,583 A | 7/1992 | Andoh | |
| 5,225,725 A | 7/1993 | Shiraki et al. | |
| 5,341,097 A | 8/1994 | Wu | |
| 5,351,003 A | 9/1994 | Bauer et al. | |
| 5,574,445 A | 11/1996 | Maresca et al. | |
| 5,691,582 A | 11/1997 | Lucas et al. | |
| 5,796,186 A | 8/1998 | Nanba et al. | |
| 5,920,248 A | 7/1999 | Travostino | |
| 6,100,681 A | 8/2000 | Tsuruta | |
| 6,573,623 B2 | 6/2003 | Tsuboi et al. | |
| 6,707,293 B2 | 3/2004 | Wan et al. | |
| 6,982,530 B2 * | 1/2006 | Takeuchi | 318/34 |
| 2001/0054851 A1 | 12/2001 | Tsuboi et al. | |
| 2007/0255087 A1 | 11/2007 | Minai | |

(Continued)

FOREIGN PATENT DOCUMENTS

DE 4428333 A1 2/1996

(Continued)

OTHER PUBLICATIONS

Invitation to Pay Additional Fees and, Where Applicable, Protest Fee dated Sep. 3, 2009 for PCT/US2009/036898.

(Continued)

*Primary Examiner* — Karen Masih

(57) ABSTRACT

To determine the relative position of movable portions of an assembly, a first magnetic device is coupled to a first portion of the assembly. The first magnetic device has a sensing surface with a number of magnetic poles that provide a magnetization state transition location. An absolute position sensor with a two-state output is coupled to the assembly adjacent the first magnetic device. The output state changes when a magnetization state transition of the first magnetic device moves past the absolute position sensor. A second magnetic device is coupled to the assembly. The second magnetic device creates a cyclically-varying magnetic field proximate its sensing surface. An incremental position sensor is coupled to the assembly adjacent the second magnetic device, and has an output that varies continuously relative to magnetic field angle over at least a portion of one cycle of the cyclically-varying magnetic field of the second magnetic device.

36 Claims, 11 Drawing Sheets

U.S. PATENT DOCUMENTS

| | | |
|---|---|---|
| 2008/0246466 A1 | 10/2008 | Jajtic et al. |
| 2009/0128930 A1 | 5/2009 | Fujioka et al. |

FOREIGN PATENT DOCUMENTS

| | | |
|---|---|---|
| DE | 200 09 814 U1 | 10/2001 |
| DE | 102004045934 A1 | 4/2006 |
| EP | 0726448 A1 | 8/1996 |
| WO | 2004015375 A1 | 2/2004 |

OTHER PUBLICATIONS

Invitation to Pay Additional Fees and, Where Applicable, Protest Fee dated Sep. 7, 2009 for PCT/US2009/036915.

International Search Report and Written Opinion dated Nov. 26, 2009 for PCT/US2009/036915.

Sentron: "2SA-10 Integrated 2-Axis Hall Sensor" Internet Citation [Online], http://www.sentron.ch/datasheets/2SA-10.pdf> [retrived Aug. 24, 2009] p. 8.

International Search Report and Written Opinion dated Dec. 23, 2009 for PCT/US2009/036898.

Machine Translation for previously submitted DE20009814.

International Preliminary Report on Patentability dated Oct. 7, 2010 for PCT/US2009/036915.

International Preliminary Report on Patentability dated Oct. 7, 2010 for PCT/US2009/036898.

EP OA dated Feb. 28, 2011 for EP Appln. No. 09725766.1.

EP OA dated Feb. 28, 2011 for EP Appln. No. 09724600.3.

* cited by examiner

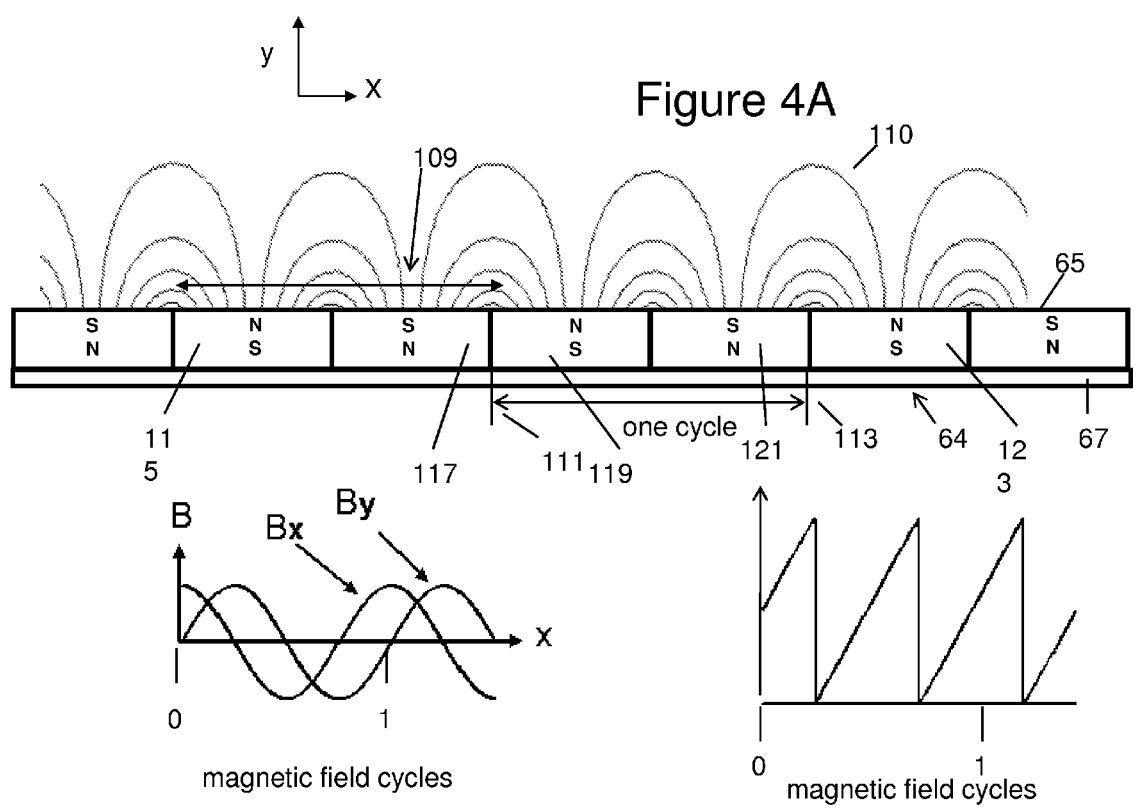

ABSOLUTE POSITION SENSING

CROSS-REFERENCE TO RELATED APPLICATIONS

This application is a continuation in part of application Ser. No. 12/055,280, filed on Mar. 25, 2008, entitled "Position Measurement Using Magnetic Fields." This application is a continuation in part of application Ser. No. 12/055,283, filed on Mar. 25, 2008, entitled "Position Measurement Using Magnetic Fields." This application also claims priority of Provisional Patent Application No. 61/234,508 filed on Aug. 17, 2009. The disclosures of the two parent applications and of the provisional patent application are incorporated herein by reference.

BACKGROUND

This disclosure relates to position sensing. There are many situations in which it is desirable to sense the position of one or more relatively moveable portions of an assembly. One example is a machine tool in which a moveable member such as a tool needs to be precisely positioned relative to a fixed member such as the workpiece or a table. Other examples include active suspension systems for vehicles or portions of vehicles that are subject to random accelerations, particularly as the vehicle moves. For active suspension systems to be effective, the position of the moveable portion of the assembly must be known.

SUMMARY

In general, in one aspect, the invention features an apparatus comprising a linear motor comprising a stator and an armature that is movable relative to the stator over a travel distance. A first magnetic device is coupled to the armature. The first magnetic device defines a sensing surface that comprises a plurality of magnetic poles that provide a magnetization state transition location there between. A magnetic pole sensor is coupled to the stator adjacent the first magnetic device such that the first magnetic device moves past the magnetic pole sensor as the armature moves relative to the stator over the travel distance, the magnetic pole sensor sensing the adjacent poles of the first magnetic device. A second magnetic device is coupled to the armature, the second magnetic device defining a sensing surface that comprises a plurality of adjacent alternating opposite magnetic poles that create a cyclically-varying magnetic field proximate its sensing surface. A magnetic field angle sensor is coupled to the stator adjacent the second magnetic device such that the cyclically-varying magnetic field of the second magnetic device moves past the magnetic field angle sensor as the armature moves relative to the stator, the magnetic field angle sensor sensing the angle of the magnetic fields of the second magnetic device and having an output that varies continuously relative to the magnetic field angle over at least a portion of one cycle of the cyclically-varying magnetic field.

Various implementations of the invention may include one or more of the following features. The magnetic pole sensor may comprise a single Hall sensor. The magnetic field angle sensor may comprise a magnetoresistive sensor. The magnetic pole sensor may comprise a bipolar Hall sensor and the magnetic field angle sensor may have a full-scale output of 180° such that its output repeats twice for each magnetic field cycle of the second magnetic device. The first magnetic device may be at least half as long as the travel distance of the armature and the second magnetic device may be at least as long as the travel distance of the armature.

Various other implementations may include one or more of the following features. The adjacent poles of the second magnetic device may meet at magnetization state transition locations, and the first and second magnetic devices may be coupled to the armature such that there is a known, defined spatial relationship between a magnetization state transition location of the first magnetic device and at least one magnetization state transition location of the second magnetic device. The transition location of the first magnetic device may be approximately centered relative to the length of the sensing surface of the second magnetic device. The magnetic field angle sensor output may reset at least one location over each magnetic field cycle, and the first and second magnetic devices may be arranged such that when the magnetic pole sensor is adjacent to a transition location of the first magnetic device, the magnetic field angle sensor is not adjacent to a location at which it resets. The apparatus may further comprise a third magnetic device coupled to the armature adjacent to the first magnetic device, the third magnetic device defining a sensing surface that defines a single magnetization state transition location over the armature travel distance, wherein the sensing surfaces of the first and third magnetic devices each comprise at least two magnetic poles, and wherein the adjacent magnetic poles of the first and third magnetic devices are of opposite polarity.

In general, in another aspect, the invention features an apparatus comprising a linear motor comprising a stator and an armature that is movable relative to the stator over a travel distance, a first magnetic device coupled to the armature, the first magnetic device defining a sensing surface that comprises a plurality of magnetic poles that provide a magnetization state transition location there between, a magnetic pole sensor coupled to the stator adjacent the first magnetic device such that the first magnetic device moves past the magnetic pole sensor as the armature moves relative to the stator over the travel distance, the magnetic pole sensor sensing the adjacent poles of the first magnetic device. There is a second magnetic device coupled to the armature, the second magnetic device defining a sensing surface defining a sensing surface that is at least as long as the travel distance of the armature and that comprises a plurality of adjacent alternating opposite magnetic poles that create a cyclically-varying magnetic field proximate its sensing surface. A magnetic field angle sensor is coupled to the stator adjacent the second magnetic device such that the cyclically-varying magnetic field of the second magnetic device moves past the magnetic field angle sensor as the armature moves relative to the stator, the magnetic field angle sensor sensing the angle of the magnetic fields of the second magnetic device and having an output that varies continuously relative to the magnetic field angle over at least a portion of one cycle of the cyclically-varying magnetic field. The adjacent poles of the second magnetic device meet at magnetization state transition locations, and the first and second magnetic devices are coupled to the armature such that there is a known, defined spatial relationship between a magnetization state transition location of the first magnetic device and at least one magnetization state transition location of the second magnetic device. The magnetic field angle sensor output resets at one or two locations over each magnetic field cycle, and the first and second magnetic devices are arranged such that when the magnetic pole sensor is adjacent to a transition location of the first magnetic device, the magnetic field angle sensor is not adjacent to a location at which it resets.

In general, in another aspect, the invention features a sensing system that is used to determine the position of one or more relatively movable portions of an assembly that move over a travel distance. The sensor system comprises a first magnetic device coupled to a first portion of the assembly, the first magnetic device defining a sensing surface that comprises a plurality of magnetic poles that provide a magnetization state transition location there between. The sensing system further comprises an absolute position sensor coupled to a second portion of the assembly adjacent the first magnetic device and having a two-state output, wherein the output state changes when a magnetization state transition of the first magnetic device moves past the absolute position sensor as the portions move relative to one another over the travel distance. There is a second magnetic device coupled to the first portion of the assembly, the second magnetic device creating a cyclically-varying magnetic field proximate its sensing surface. An incremental position sensor is coupled to the second portion of the assembly adjacent the second magnetic device and has an output that repeats at least once for each cycle of the cyclically-varying magnetic field of the second magnetic device.

Various implementations of the invention may include one or more of the following features. The absolute position sensor may comprise a Hall sensor. The incremental position sensor may comprise a magnetic field angle sensor coupled to the second portion of the assembly such that as the cyclically-varying magnetic field of the second magnetic device moves past the magnetic field angle sensor the magnetic field angle sensor senses the angle of the magnetic fields of the second magnetic device and has an output that varies continuously relative to the magnetic field angle over at least a portion of one cycle of the cyclically-varying magnetic field. The second magnetic device may define a sensing surface that comprises a plurality of adjacent alternating opposite magnetic poles that create the cyclically-varying magnetic field proximate its sensing surface. The magnetic pole sensor may comprise a bipolar Hall sensor and the magnetic field angle sensor may have a full-scale output of 180° such that its output repeats twice for each magnetic field cycle of the second magnetic device. The first magnetic device may be at least half as long as the travel distance and the second magnetic device may be at least as long as the travel distance.

Various other implementations may include one or more of the following features. Adjacent poles of the second magnetic device may meet at magnetization state transition locations, and the first and second magnetic devices may be coupled to the armature side-by-side such that there is a known, defined spatial relationship between the magnetization state transition location of the first magnetic device and the adjacent magnetization state transition location of the second magnetic device. The transition location of the first magnetic device may be approximately centered relative to the length of the sensing surface of the second magnetic device. The magnetic field angle sensor output may reset at least one location over each magnetic field cycle, and the first and second magnetic devices may be arranged such that when the Hall sensor is adjacent to the transition location of the first magnetic device, the magnetic field angle sensor is not adjacent to a location at which it resets. The sensor system may further comprise a third magnetic device coupled to the first portion of the assembly alongside of the first magnetic device, the third magnetic device defining a sensing surface that defines a single magnetization state transition location over the travel distance, wherein the sensing surfaces of the first and third magnetic devices each comprise at least two magnetic poles, and wherein the adjacent magnetic poles of the first and third magnetic devices are of opposite polarity.

In general, in another aspect, the invention features a control system that controls one or more actuators that move relatively movable portions of an assembly so as to control the position of the portions of the assembly. The control system comprises an absolute position sensor with a two-state output, one state indicative of a first part of the relative movement and the other state indicative of a second, different part of the relative movement. There is an incremental position sensor with an output that varies continuously over at least a portion of each of a plurality of repeating cycles associated with the relative movement, and a controller that receives the outputs of both sensors. At start-up at least one of the portions of the assembly is moved until the output of the absolute position sensor changes state, and in response the controller determines the absolute positions of the portions of the assembly.

Various implementations of the invention may include one or more of the following features. The controller may track information indicative of the cycle currently being sensed by the incremental position sensor, and after start-up, upon relative movement of the portions of the assembly the controller may determine the absolute position of at least one of the portions of the assembly based on both an identification of which of the cycles is currently being sensed by the incremental position sensor, and the output of the incremental position sensor. At start-up the controller may determine the absolute positions of the portions of the assembly based at least in part on the identification of which of the plurality of cycles is currently being sensed by the incremental position sensor. The total number of cycles may be fixed, and the controller may detect an error if the number of cycles that are tracked exceeds a predetermined number of cycles. The absolute position sensor may be used to confirm correct tracking of cycles. The sensors may be non-contact sensors. The absolute position sensor may comprise a Hall sensor, and the incremental position sensor may comprise a magnetoresistive sensor.

In general, in another aspect, the invention features a method of operating a control system that controls one or more actuators that move one or more relatively movable portions of an assembly so as to control the position of the portions of the assembly. The control system comprises an absolute position sensor with a two-state output, one state indicative of a first part of the relative movement of the portions of the assembly and the other state indicative of a second, different part of the relative movement. There is an incremental position sensor with an output that varies continuously over at least a portion of each of a plurality of repeating cycles associated with the relative movement, and a controller that receives the outputs of both sensors and outputs a control signal. The controller outputs a signal that results in the movement of at least one portion of the assembly until the state of the absolute position sensor changes, and the absolute position of at least one of the portions of the assembly is determined based on at least the output of the incremental position sensor.

Various implementations of the invention may include one or more of the following features. The controller may track information indicative of the cycle currently being sensed by the incremental position sensor, and upon relative movement of the portions of the assembly the controller may determine the absolute position of at least one of the portions of the assembly based on both an identification of which cycle is currently being sensed and the output of the incremental position sensor. The total number of cycles may be fixed, and the controller may detect an error if the number of cycles that are tracked exceeds a predetermined number of cycles. The absolute position sensor may be used to confirm correct tracking of cycles.

In general, in another aspect, the invention features a positioning system for positioning a movable portion of an assembly relative to another portion of the assembly. The positioning system comprises an electromagnetic motor comprising a stator, and an armature that is coupled to the movable portion of the assembly and is movable relative to the stator over a travel distance. A single-phase actuator is coupled to the movable portion of the assembly. A first magnetic device is coupled to the armature, the first magnetic device defining a sensing surface that comprises a plurality of magnetic poles that provide a magnetization state transition location there between. A magnetic pole sensor with a two-state output is coupled to the stator adjacent the first magnetic device such that the first magnetic device moves past the magnetic pole sensor as the armature moves relative to the stator over the travel distance. One state of the magnetic pole sensor output is indicative of a first part of the relative movement and the other state is indicative of a second, different part of the relative movement. A second magnetic device is coupled to the armature, the second magnetic device defining a sensing surface that comprises a plurality of adjacent alternating opposite magnetic poles that create a cyclically-varying magnetic field proximate its sensing surface. A magnetic field angle sensor is coupled to the stator adjacent the second magnetic device such that the cyclically-varying magnetic field of the second magnetic device moves past the magnetic field angle sensor as the armature moves relative to the stator, the magnetic field angle sensor sensing the angle of the magnetic fields of the second magnetic device and having an output that varies continuously relative to the magnetic field angle over at least a portion of each of a plurality of cycles of the cyclically-varying magnetic field. A controller, responsive to both sensors, controls the single-phase actuator to move the movable portion of the assembly until the output of the magnetic pole sensor changes state. In response to the state change the controller determines the absolute position of at least one of the portions of the assembly.

Various implementations of the invention may include one or more of the following features. The electromagnetic motor may comprise a linear multi-phase electromagnetic motor and the single-phase actuator may comprise an air cylinder. The controller may track information indicative of the cycle currently being sensed by the magnetic field angle sensor, and upon relative movement of the portions of the assembly the controller may determine the absolute position of at least one of the portions of the assembly based on both an identification of which of the plurality of cycles is currently being sensed by the magnetic field angle sensor, and the output of the magnetic field angle sensor. The magnetic pole sensor may comprise a Hall sensor and the magnetic field angle sensor may comprise a magnetoresistive sensor. The movable portion may comprise a seat in a motor vehicle.

BRIEF DESCRIPTION OF THE DRAWINGS

FIG. 4A is a schematic side view of a magnetic device for an embodiment of the invention, illustrating its magnetic field lines proximate its sensing surface;

FIG. 4B is a graph showing magnetic field components thereof relative to position along the x axis;

FIG. 4C is a graph showing the output of an incremental position sensor for an embodiment of the invention in relation to its position relative to the x axis of the magnetic device of FIG. 4A;

DETAILED DESCRIPTION

This invention may be accomplished in a position sensing system and method that is used to determine the position of one or more relatively movable portions of an assembly that move over a travel distance. A first magnetic device is coupled to a first portion of the assembly. The term "coupled" as used herein can mean either direct mechanical coupling of two devices, structures or members (in this case, the first magnetic device to the first portion of the assembly), or indirect mechanical coupling such as may be accomplished with one or more other devices, structures or members located between the magnetic device and the first portion of the assembly. The first magnetic device has a sensing surface that defines one or more magnetization state transition locations over the travel distance. One or more absolute position sensors are coupled to a second portion of the assembly adjacent the first magnetic device. The absolute position sensors preferably have a two-state output wherein the output state changes when a magnetization state transition of the first magnetic device moves past an absolute position sensor as the portions move relative to one another over the travel distance. A second magnetic device is coupled to the first portion of the assembly. The second magnetic device creates a cyclically-varying magnetic field proximate its sensing surface. An incremental position sensor is coupled to the second portion of the assembly adjacent the second magnetic device, and has an output that repeats in direct relation to the cycles of the second magnetic device. For example, the output of the incremental position sensor can repeat once for each cycle of the second magnetic device, or can repeat twice for each cycle of the second magnetic device. The output of the incremental position sensor may vary continuously relative to the magnetic field angle over each repetition of its output, so that the position with respect to each cycle can be determined via the output of the incremental position sensor. The term "continuously" as used herein relative to the output of the incremental position sensor means that the output is a continuous function of sensed magnetic field angle over the sensor output range, which in the embodiments is either 180° or 360°. Typically, the incremental position sensor output varies monotonically over its output range, and resets an integral number of times over each cycle of the cyclically-varying magnetic field.

Figure 1:
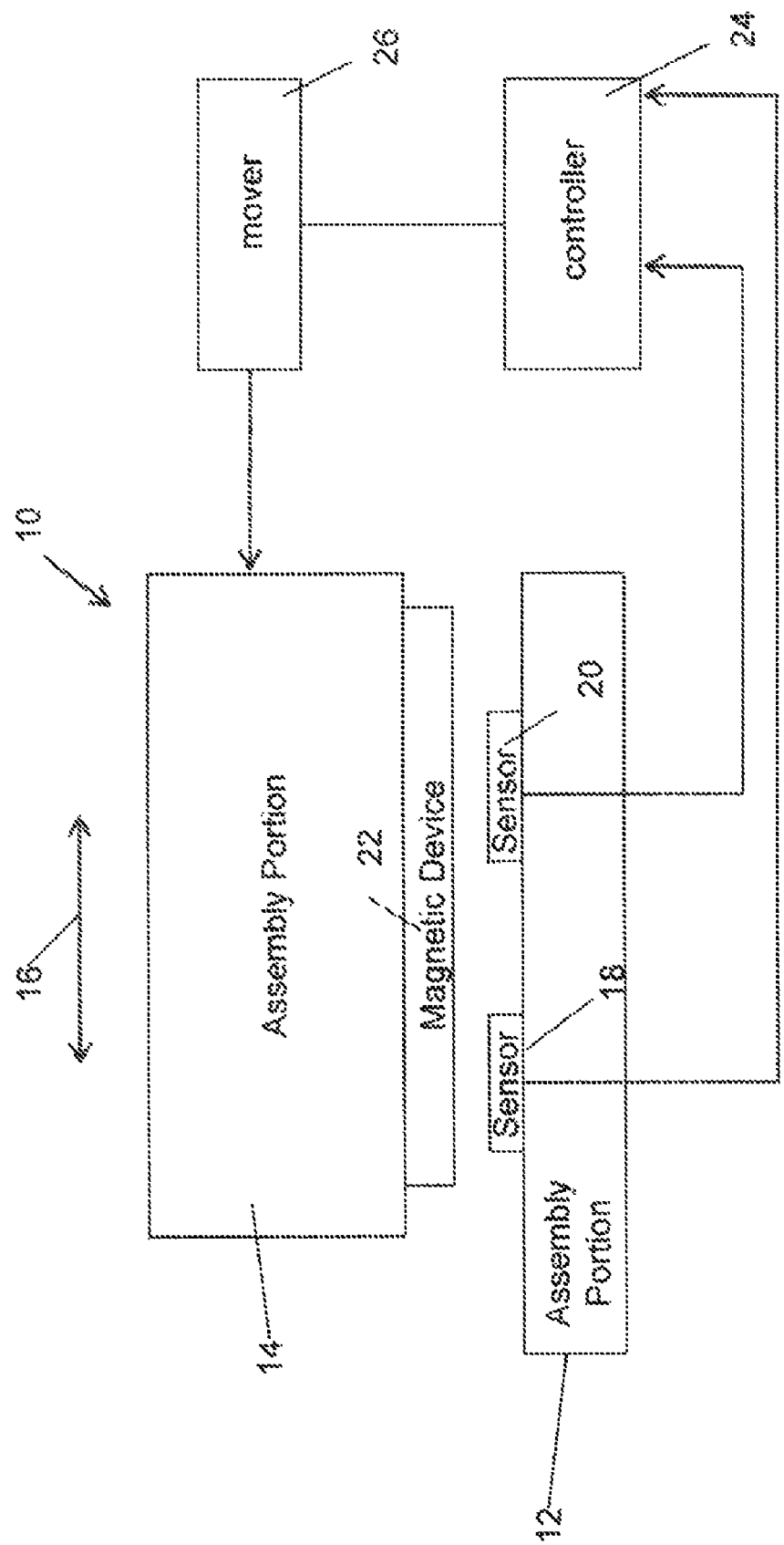
FIG. 1 is a schematic diagram of a position control system with position sensing according to the invention.

FIG. 1 shows an assembly 10 having portions 12 and 14. One or both of portions 12 and 14 are moveable relative to each other to accomplish a desired relative position between portions 12 and 14. In the example shown, portion 14 is moveable back and forth laterally in the direction of arrow 16 and portion 12 is fixed. However, the invention is useful with an assembly comprising two or more portions, any one or more of which is moveable relative to any one or more of the other portions.

Assembly 10 further includes sensors 18 and 20 whose outputs are provided to controller 24. The output of controller 24 is provided to mover 26 that moves portion 14 relative to portion 12. Mover 26 may comprise one or more devices, such as actuators, known in the art. The movers may be single-phase or multi-phase devices.

One of sensors 18 and 20 is an absolute position sensor with a two-state output. One state is indicative of a first part of the relative movement of portions 12 and 14, and the other state is indicative of a second, different part of the relative movement. The other of sensors 18 and 20 is an incremental position sensor with an output that varies continuously over at least part of each of a number of separate cycles over both the first and second parts of the relative movement. In embodiments described herein, sensors 18 and 20 are non-contact sensors. In embodiments described herein, sensors 18 and 20 are magnetic sensors that sense aspects of one or more magnetic devices as represented by magnetic device 22 located on portion 14 adjacent to sensors 18 and 20.

Figure 2:
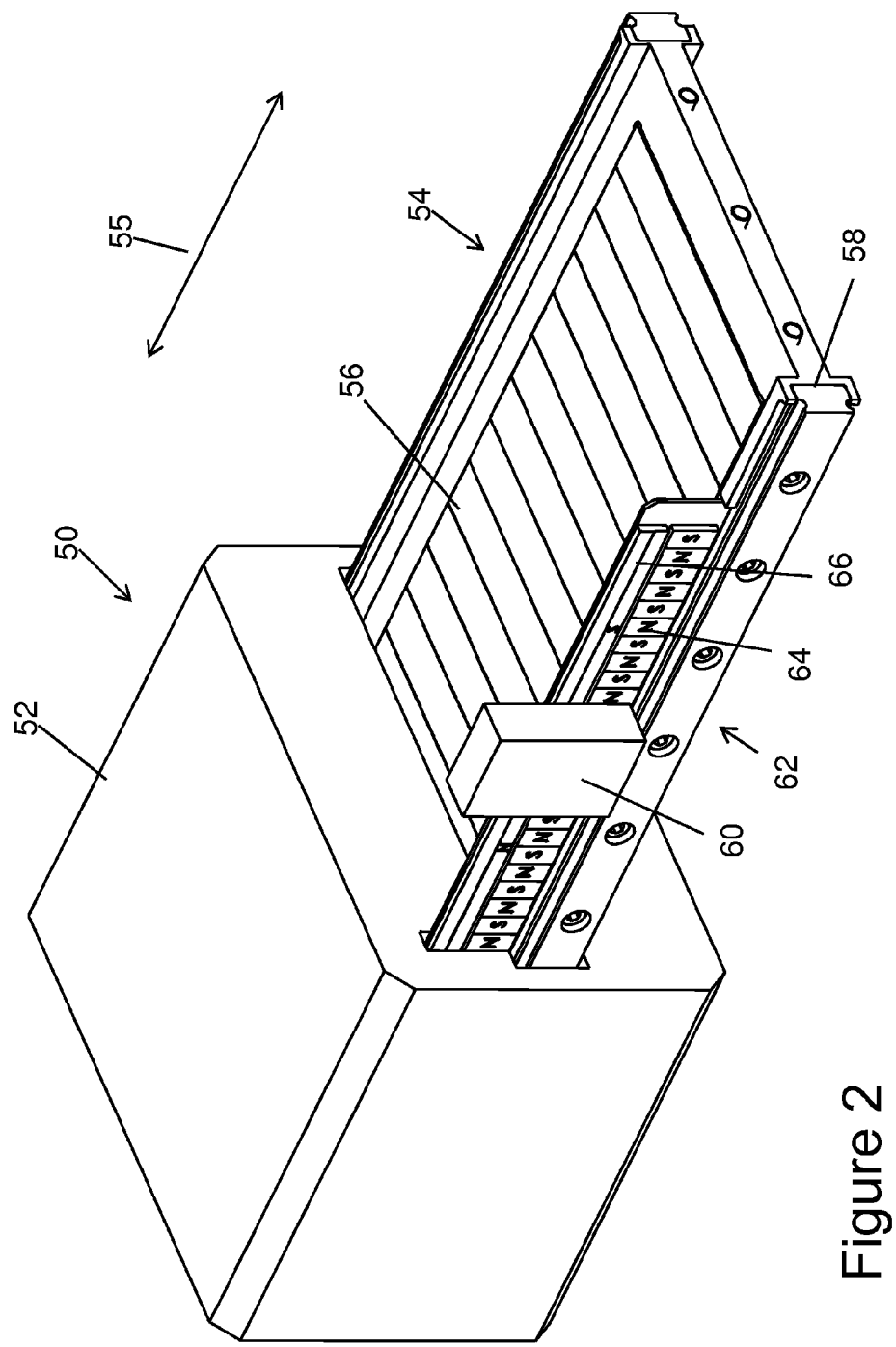
FIG. 2 is a perspective view of a linear motor incorporating an embodiment of the invention.

FIG. 2 depicts a linear motor 50 having stator 52 and armature 54. This is one example of an assembly with which the invention can be used. Armature 54 defines a series of magnetic poles 56. Armature 54 is moved in and out relative to stator 52 in the direction of arrow 55; the operation of linear motors is well understood. Linear motors have application in many systems that benefit from linear motion. One such system, which is a non-limiting example of a system with which the invention can be used, is an active suspension system, such as for motor vehicle suspension or for vibration or acceleration control. One non-limiting example of vibration and acceleration control is control of unwanted vibrations and other accelerations of a seat in a motor vehicle.

Sensing system 62 according to an embodiment of the invention senses the position of armature 54 relative to stator 52. This is accomplished in the example by including first magnetic member 66 and second magnetic member 64 that are each directly (or indirectly) mechanically coupled to rail 58 of armature 54. Sensor structure 60 is mechanically coupled to stator 52 or another fixed portion of the assembly such that magnetic devices 64 and 66 move in the direction of arrow 55 relative to sensor structure 60 as armature 54 is moved in and out relative to stator 52.

Figure 3A:
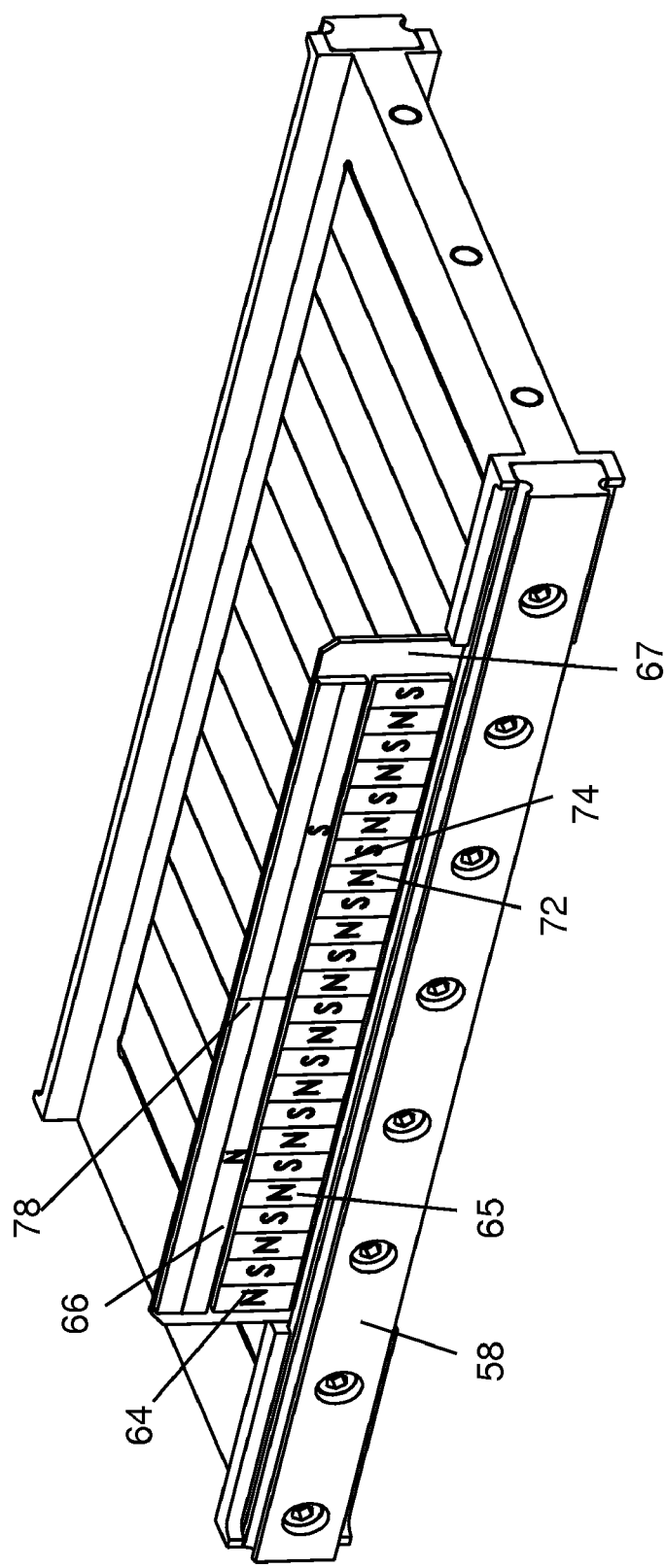
FIG. 3A is a perspective view of a portion of the system shown in FIG. 2 detailing embodiments of magnetic devices for use in an embodiment of the invention.

One specific embodiment of these two magnetic devices is depicted in FIG. 3A. First magnetic device 66 comprises an elongated strip that defines two magnetic poles at its sensing surface along its length (the poles are indicated by "N" for a north pole and "S" for a south pole). These poles meet at location 78 which defines a magnetization state transition location. Device 66 is preferably as long as the armature travel distance, but need not be so. In certain embodiments, device 66 defines a single magnetization state transition over the entirety of the armature travel. In other embodiments, device 66 defines more than two alternating poles along the length of its sensing surface in the armature travel direction, and thus defines more than one magnetic state transition location. Also, device 66 preferably (but not necessarily) presents a single magnetic pole over the entire armature travel from both travel end points to the magnetic state transition, so that the sensor output can directly indicate which part of the travel the armature is in relative to the transition; this is further explained below.

Second magnetic device 64 in this non-limiting embodiment is adjacent to and alongside of device 66; other physical arrangements of the two magnetic devices are contemplated, as described below. Second magnetic device 64 defines a sensing surface 65 that comprises a number of adjacent alternating magnetic poles such as poles 72 and 74. The alternating poles create a cyclically-varying magnetic field proximate sensing surface 65 along the travel dimension of armature 54. Preferably, device 66 is at least as long as the armature travel distance such that the cyclical field is present throughout armature travel. Device 66 need not have this length, though, as further described below. In the physical arrangement of the two magnetic devices depicted in the drawing, transition 78 may be approximately centered on the sensing surface of device 66 and may be approximately centered on the sensing surface of device 64, but this arrangement is not required and is not a limitation of the invention.

The invention contemplates other manners of creating and/or sensing a cyclic variation along the length of travel of the relatively-movable portions of an assembly, so that the cycle, together with the location within the cycle, are indicative of the absolute position. For example, an optical sensor can sense a monotonically-varying feature located on a portion that is moved past the sensor. A two-dimensional charge coupled device could sense active or passive (e.g., reflective) light sources laid out so as to present the necessary variability, for example by arranging the light sources along a curve (e.g., an angled line) relative to the axis of motion.

Magnetic devices 64 and 66 may be mounted to flange 67 that is coupled to the armature, for example sandwiched behind armature rail 58. In one embodiment, flange 67 and rail 58 can be made of ferromagnetic material. One result is that backing flange 67 acts as back-iron for the two magnetic devices and rail 58 provides some shielding from stray magnetic fields.

Figure 3B:
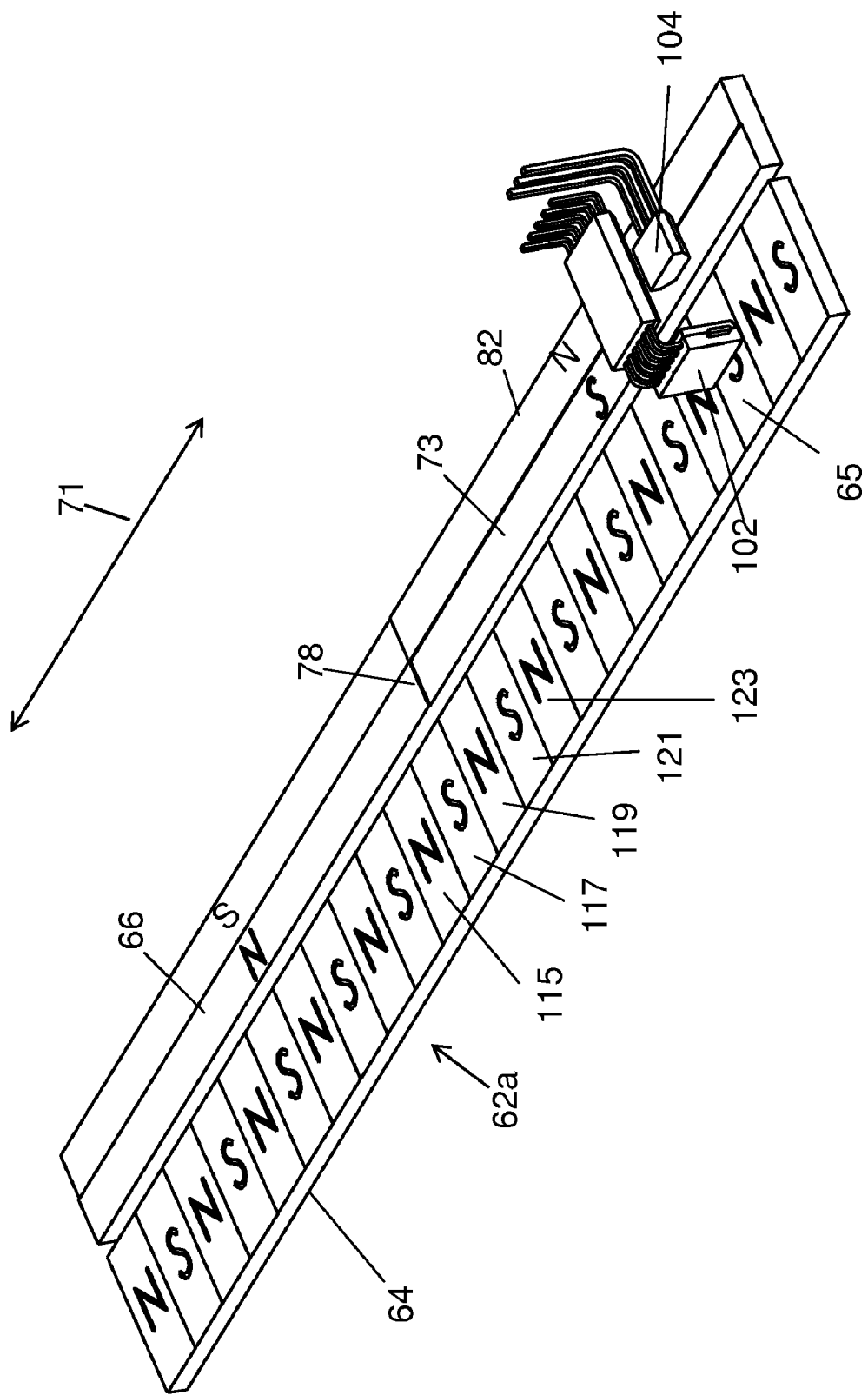
FIG. 3B is a similar view showing additional embodiments of magnetic devices for an embodiment of the invention and also detailing an absolute position sensor and an incremental position sensor for an embodiment of the invention.

A similar arrangement of magnetic devices is shown in alternative embodiment 62a, FIG. 3B. Embodiment 62a includes a third magnetic device 82 that is the same shape, size and length as device 66 and located directly alongside thereof. Device 82 defines poles that are opposite the poles of device 66 to which they are adjacent. This third magnetic device helps to confine the magnetic fields from the combination of devices 66 and 82. This accomplishes a more well-defined field for sensor 104 to sense. Also, the dipole structure accomplished by the combination of devices 82 and 66 reduces stray fields from the combination device that could alter the cyclical magnetization vector present above sensing surface 65 of device 64.

The structures of and physical arrangement of magnetic devices 64 and 66 (and device 82 when it is present) can be varied in other manners. In order for the sensing system to function, the absolute position sensor or sensors need to sense a magnetic state transition at a predefined point, and at this point the system must be aware of its location in the current cycle of device 64. With this information, the system can then maintain absolute position by tracking the cycles and the location within the currently-sensed cycle. Accordingly, the first magnetic device 66 could define one, or more than one, transition along the length of travel, as long as the system maintains some means of determining which transition is sensed. If more than one transition is defined, more than one absolute position sensor may be used so as to resolve possible ambiguity in which transition is being sensed. Having a single transition simplifies the system, as a single bi-stable Hall sensor can thus be used as the absolute position sensor. Also, second magnetic device 64 can be located anywhere so long as it moves with the movable portion of the assembly and can be sensed by the incremental position sensor; there is no requirement that the two magnetic devices lie side-by-side. However, locating devices 64 and 66 alongside of one another allows for a more compact arrangement of the two sensors in a single assembly, and so provides certain advantages. Also, aligning the state transition location of device 66 with the meeting point of two magnet segments of device 64 provides visual cues that ease assembly of the system but by no means is required.

The embodiments shown in FIGS. 3A and 3B illustrate that each of the two or three magnetic devices is a separate structure. However, that is not a limitation of the invention as the magnetic devices can be combined into a fewer (or greater) number of physical structures, as would be understood by one skilled in the art. For example, both of the magnetic devices shown in FIG. 3A, or all three of the magnetic devices shown in FIG. 3B, can be created in one physical structure. Alternatively, magnetic devices 66 and 82 can be created on one structure and device 64 can be separate. In a preferred embodiment, devices 64 and 66 are separate. Strip magnets with poles created or "printed" thereon that can be used in the embodiment are available from Bogen Electronic GmbH, Berlin, Germany.

An embodiment of the inventive sensing system comprises an absolute position sensor and an incremental position sensor. In the embodiment depicted in FIG. 3B, the absolute position sensor is accomplished with Hall sensor 104 that is located close to the sensing surface 73 of device 66. Sensor 104 is generally fixed relative to device 66 in all degrees of freedom other than the relative motion in the intended travel direction. However, some variation in another degree of freedom of the relative position of the sensor to the magnetic device can be tolerated if the sensor output is substantially insensitive to such variation. For example, if there is some variation in the height of sensor 104 above sensing surface 73 of device 66 (e.g., due to manufacturing tolerances of device 66 and/or the structure to which it is coupled) sensor 104 can still detect the magnetic state transition. Sensor 104 may be a bipolar device that has an output of one state when it senses one magnetic pole and has an output of a different state when it senses the opposite magnetic pole. The 1220 series sensor from Allegro Microsystems, Inc. of Worcester, Mass. may be used. By creating a known physical position of magnetic device 66 relative to the overall travel of the armature (or other moveable portion of an assembly), the output of sensor 104 is indicative of one of two parts of the overall travel. As device 66 moves relative to sensor 104 (movement is in both directions of arrow 71) the output state of sensor 104 will change at magnetization state transition location 78. Since the physical relationship between device 66 and the movable portion of the assembly being sensed (armature 54 in this embodiment) is known a priori, the output state of sensor 104 in this instance indicates in which part of its travel armature 54 is located. In the described embodiment, the length of magnetic device 66 is coincident with the overall travel of the armature, and transition 78 is located at its center. In this case, the output of Hall sensor 104 indicates which half of the travel the armature is currently located in.

There are other possible arrangements of magnetic device 66. In order for a positioning system at startup to determine the direction to move in order to sense the state transition, device 66 must cover at least the part of the armature travel from the transition location to one armature travel end point; in this case, if a pole of device 66 is sensed, then the system will know that the armature is located in this part of the travel, and will know the direction to move in order to sense the transition. Alternatively, if sensor 104 is a unipolar Hall sensor that has no output when not located proximate a magnetic pole, the absence of an output is interpreted as the sensor not being located over device 66, in which case the system will know that the armature is in the part of its travel not covered by device 66, and will know the direction to move to sense the transition. In the extreme it may be possible for device 66 to define at its sensing surface only a single pole with no transition, and as long as this pole is located at a defined position over the armature travel (the "home" position), the positioning system would be able to function at startup by moving (perhaps randomly within the normal range of motion) until this pole was sensed.

Incremental position sensor 102 is located close to sensing surface 65 of device 64. Sensor 102 is generally fixed relative to device 64 in all degrees of freedom other than the relative motion in the intended travel direction. However, some variation in another degree of freedom of the relative position of the sensor to the magnetic device can be tolerated if the sensor output is substantially insensitive to such variation. For example, if there is some variation in the height of sensor 102 above sensing surface 65 of device 64 (e.g., due to manufacturing tolerances of device 64 and/or the structure to which it is coupled) sensor 102 can still detect the magnetic field angle. The output of sensor 102 repeats twice for each cycle of magnetic device 64 as device 64 moves relative to sensor 102 in the direction of arrow 71.

In one non-limiting embodiment, incremental position sensor 102 may be a magnetoresistive device that senses the angle of the magnetic fields of the second magnetic device and has a 180° output that varies (increases or decreases) monotonically relative to the magnetic field angle (except when the device resets between its maximum and minimum values, causing its output to be momentarily discontinuous, as further explained below), and repeats twice over each 360° cycle. Alternatively, sensor 102 may be a Hall-effect field direction sensor that has a 360° output that varies continuously over each cycle of the magnetic field. Both types of sensors are known in the art. In the preferred embodiment, a magnetoresistive KMA-200 sensor available from NXP Semiconductors, Eindhoven, The Netherlands, is used.

The operation of the Hall sensor and the magnetoresistive sensor in the preferred embodiment are further explained with reference to FIGS. 4A, 4B, 4C, 5A, 5B and 6. FIG. 4A schematically depicts a portion of second magnetic device 64 with its upper sensing surface 65 that defines alternating poles that create a cyclically-varying magnetic field 110 proximate surface 65. Sensor 102 is located approximately at measurement line 109 such that it senses the angle of field 110. FIG. 4B depicts the x and y flux density components along measurement line 109, with direction x being the direction of motion of magnetic device 64 and direction y being the direction toward and away from surface 65. As shown in FIG. 4B, the magnetic field angle varies sinusoidally. One cycle of the magnetic field of device 64 is created by every pair of adjacent north-south poles. One arbitrarily-defined cycle depicted in FIGS. 4A-4C begins at the "home" location 111 where magnet segment or portion 117 meets segment 119 (at a S-N transition at sensing surface 65), and runs to location 113 where segment 121 meets segment 123 (the next S-N transition), and includes the fields adjacent to the sensing surfaces of both segments 119 and 121. This same cycle is indicated in FIGS. 4B and 4C. The output of sensor 102 varies continuously with angle, except for the discontinuities where the output resets by jumping or flipping between maximum and minimum values.

As magnetoresistive sensor 102 has a 180° rather than a 360° output, the output of the sensor (shown in FIG. 4C) repeats twice (two cycles) for every one cycle of the cyclically-varying magnetic field shown in FIG. 4B. The output of sensor 102 is a monotonically increasing value from zero to 180° over the distance (width in the travel direction) of travel equal to the width of the magnetic pole or segment. Presuming that the segments have the same width, the output repeats regularly over the entire travel distance. The output of sensor 102 is arbitrarily set such that it is at approximately its mid-value)(90° at each meeting point between adjacent segments, and moves between its maximum and minimum values at approximately the center of each segment. However, this arrangement is not a limitation of the invention, as the sensor output will change continuously as the magnetic field angle changes, regardless of the location of the home position, and regardless of the field angle change that causes the sensor output to essentially instantaneously move between its maximum and minimum values.

Figure 5A:
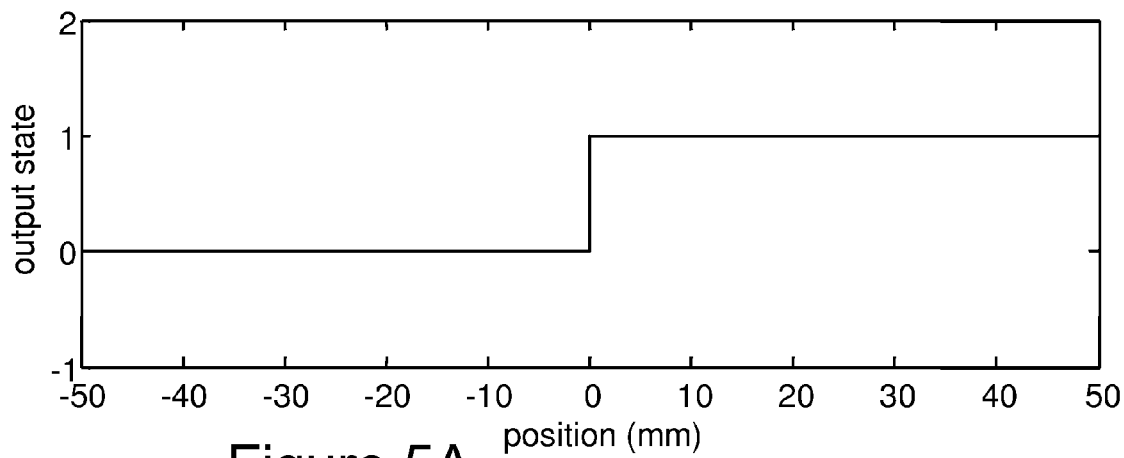
FIGS. 5A and 5B show the outputs of the sensors shown in FIG. 3B as they are moved relative to the magnetic devices shown in FIG. 3B.
Figure 5B:
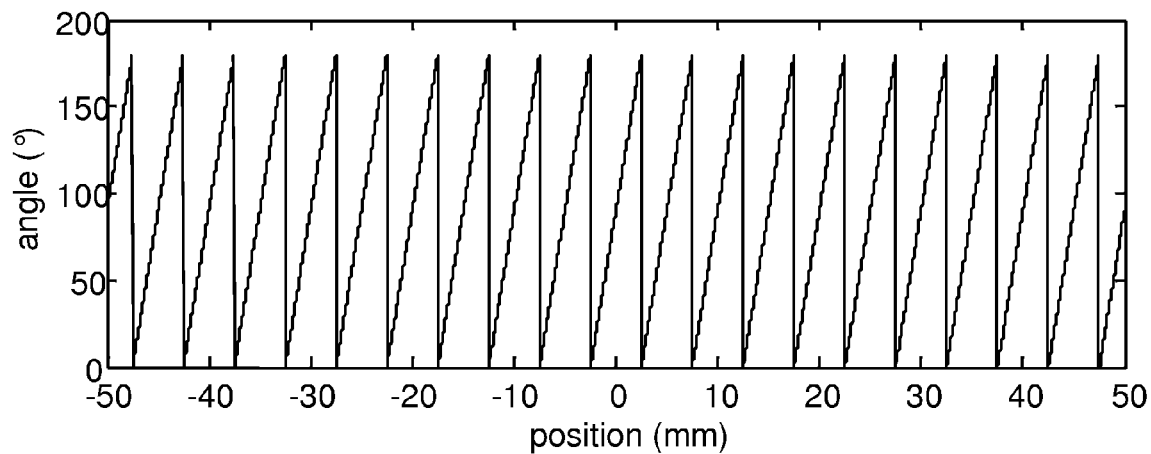

FIGS. 5A and 5B illustrate the two-state output of Hall sensor 104 (state "0" or state "1") and magnetoresistive sensor 102 (angle, from)0-180°, respectively, according to x position relative to the magnetic devices 66 and 64, respectively for the preferred embodiment. The output state change of the Hall sensor occurs once over the travel of the relatively movable members or portions (e.g., over the travel distance of the armature) at what can be termed the "home" position 78 of the sensor system, labeled as position "0" in FIGS. 5A and 5B. Preferably, the two magnetic devices and the sensors associated with these devices are arranged physically such that the incremental position sensor is sensing a known cycle when the absolute position sensor is sensing a state transition. This allows the sensor system to determine the absolute position when the state transition is sensed, and then maintain absolute position sensing as the portions are moved from the home position. A condition that should be avoided so as to avoid ambiguity in position determination is for the incremental position sensor to be in its transition (jumping or flipping between its low and high angle output) when the absolute position sensor is sensing a state transition.

As the moveable portion of the assembly is then moved from this home position, the output of the incremental position sensor repeats cyclically, over a distance equal to the width of each magnetic pole or "segment." If the system maintains knowledge of the cycle or segment being sensed, the output of the incremental position sensor thus indicates the absolute position (the cycle and the position within that cycle) of the moveable portion relative to the fixed portion.

In order for the system to keep track of the cycle of the incremental position sensor as movement from the home position occurs, a design constraint is that while traveling at maximum velocity the maximum distance traveled per sample of incremental position sensor 102 must remain less than the distance from the home position to the closest location at which the output jumps or flips between its high and low values (which in the non-limiting preferred embodiment is the center of each magnetic pole). If this constraint is not met, there is a possibility of moving from the home position past a transition on either side of the "home" position without sensing the field angle (and thus a location). This would cause the control system to lose track of its count of magnet segments of device 64.

There is a relationship between pole width (w) (meters) of the incremental magnetic strip, the sample rate ($f_s$) (samples per second) of the control system, and the maximum velocity of the sensor strip relative to the incremental position sensor ($v_{max}$) (meters per second) that will allow for successful decoding of displacement. The incremental position sensor has a full-scale output of 180°. The decoder identifies a jump or flip by looking for a change in angle measurement from sample to sample of greater than the normal maximum angle change. In one example, to ensure that decoding is possible normal changes in the angle measurement at maximum velocity are required to be less than |90°|. Thus, $$180°/(w/v_{max} \times f_s) < 90°$$

Figure 6:
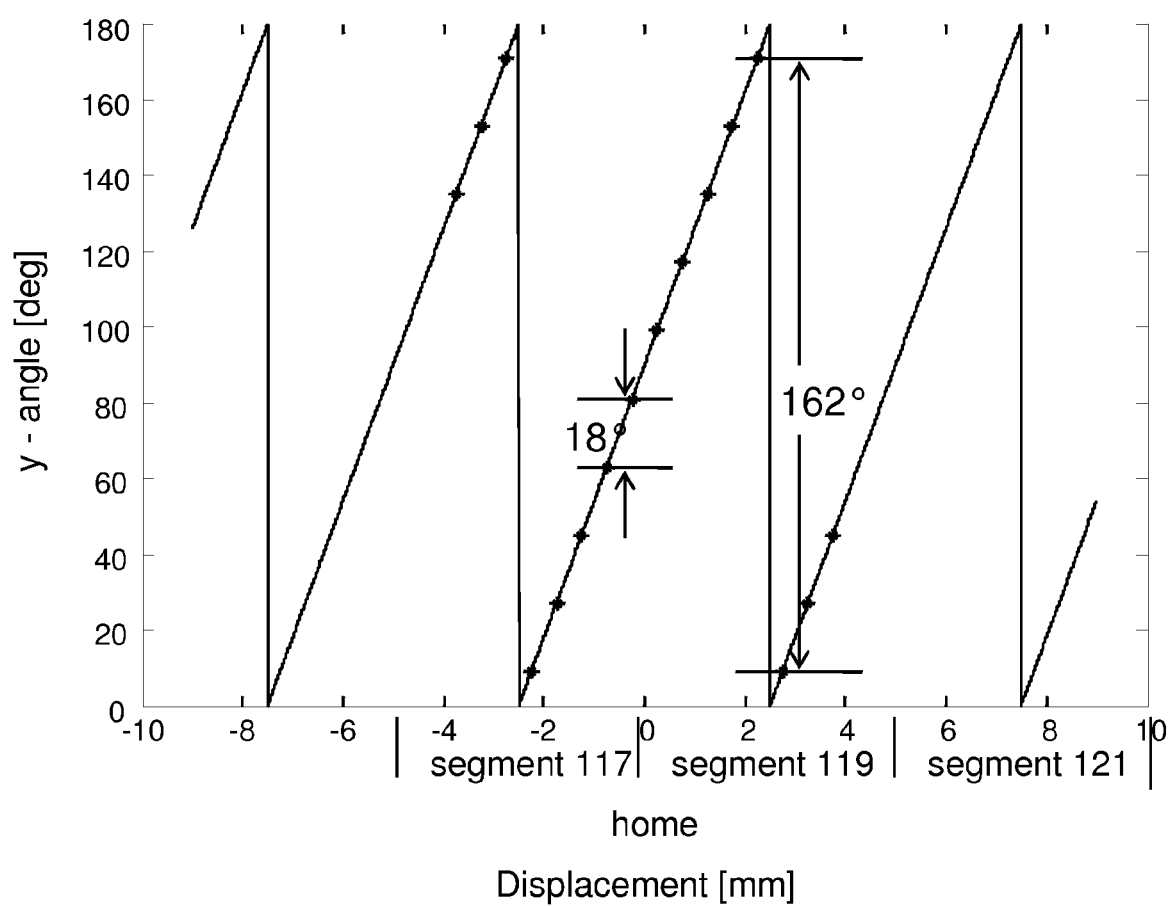
FIG. 6 is a more detailed view of a portion of the graph of FIG. 4C useful in explaining an embodiment of the invention.

FIG. 6 is a graph of incremental position sensor output data taken using the embodiment shown in FIGS. 2 and 3B, with movement relative to magnet segments 117, 119 and 121. With the linear motor operating such that the incremental position sensor output occurs at intervals of about 0.5 mm (ten samples per 5 mm width of the magnetic segments or poles of magnetic device 64), and with a 180° output from the magnetoresistive sensor, there is a maximum normal operating change in angle of no more than 18 degrees per data point. Run-time decoding of the segment count (N) is as follows (N=0 at home position): when traversing in the +x direction (to the right in FIG. 6), if the difference in angle output between the present measurement and the previous measurement is less than −90° (and thus a jump or flip from maximum value to minimum value has occurred), then increase the segment count (N=N+1). When traversing in the −x direction, if the difference in angle output between the present measurement and the previous measurement is greater than +90° (and thus a jump or flip from minimum value to maximum value has occurred), then decrement the segment count (N=N−1).

Figure 7A:
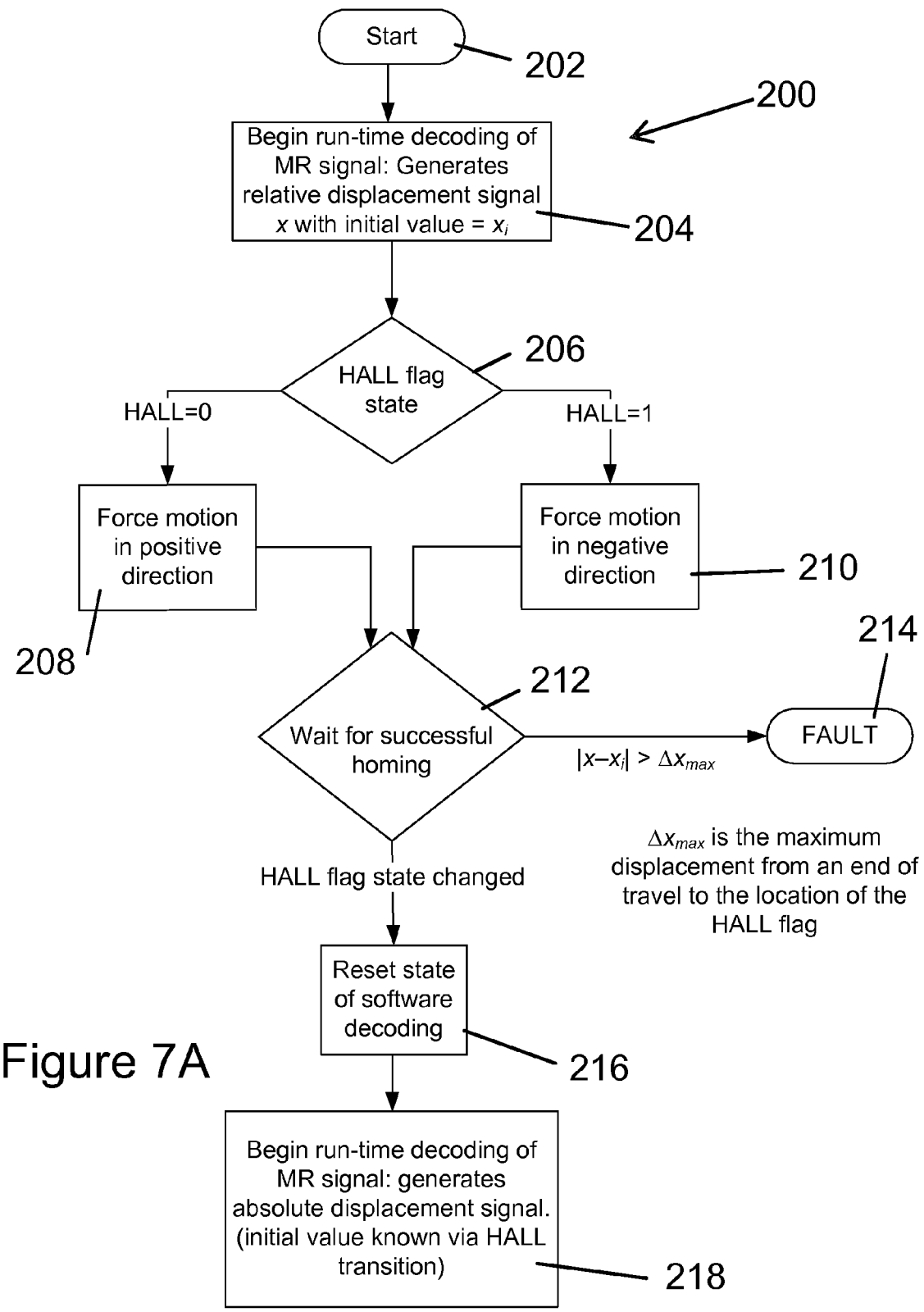
FIG. 7A is a flow chart showing startup of a control system using one embodiment of the invention.
Figure 7B:
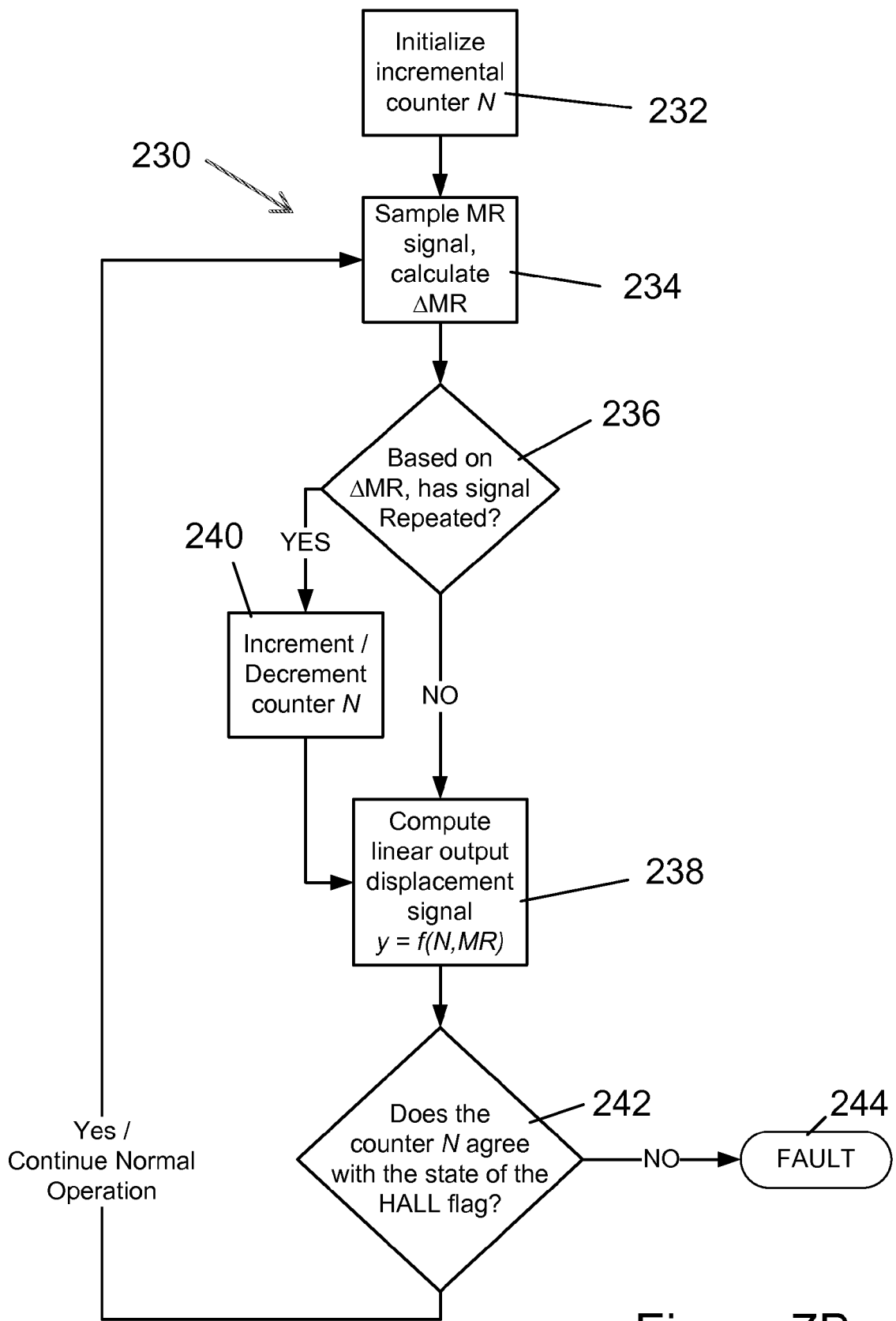
FIG. 7B is a flow chart showing operation of the control system using one embodiment of the invention.

FIG. 7A is a flow chart 200 showing startup using one embodiment of the invention. On start, step 202, the output of the incremental position sensor (termed "MR" for magnetoresistive sensor) is decoded as a means to determine the position relative to any particular sensing cycle, step 204. The output state of the absolute position sensor (termed the Hall state) is determined, step 206. One state (arbitrarily termed "0") is indicative of one part of the relative movement of the relatively moveable portions of an assembly. If this state is sensed, the movable portion is moved toward the state transition or home location (termed the "positive" direction), step 208. If the other state (state "1") is sensed, the moveable portion is in another, different part of the overall relative movement, and so movement is forced in the other direction (termed "negative"), step 210. Movement continues until the state changes, termed a "successful homing" in step 212. If the displacement since startup exceeds the maximum permissible displacement (the maximum distance from an end of travel to the location of the magnetic state or Hall transition (or "flag"), a fault is indicated, step 214. Otherwise, the state of decoding of the incremental position sensor is reset at the home position, step 216. Run time decoding of the incremental sensor then begins, step 218, and operation moves to flow chart 230, FIG. 7B.

An incremental segment counter is initialized, step 232. With reference to the description above, this means that the counter is set to the home magnet segment or pole. The incremental position sensor output is used to determine its change, step 234. If the sensor output has repeated, step 236, the counter is changed, step 240. The actual displacement is then calculated, step 238. The segment is known (counter N), and this together with the incremental position sensor output is sufficient for the controller to determine the absolute position. As an alternative, if only the gross position needs to be known (e.g., within the width of the segments of magnetic device 64) the absolute position can be based on the cycle being sensed and not the relative output of the incremental position sensor.

If the counter agrees with the state of the absolute position sensor, step 242, normal operation continues. If it does not, meaning that the system has somehow lost track of the segments, a fault is indicated, step 244. A fault can also be based on a disagreement between the number of segments that have been counted (moved through) as compared to the overall number of segments. For example, if there are 10 segments in each half of the movement (on each side of the home position), and the controller has tracked motion over 11 segments in one half of the armature travel, a fault is indicated. Since there are two magnetic poles or segments per cycle of the magnetic field proximate the sensing surface of device 64, tracking segments is equivalent to tracking magnetic field cycles.

Figure 8:
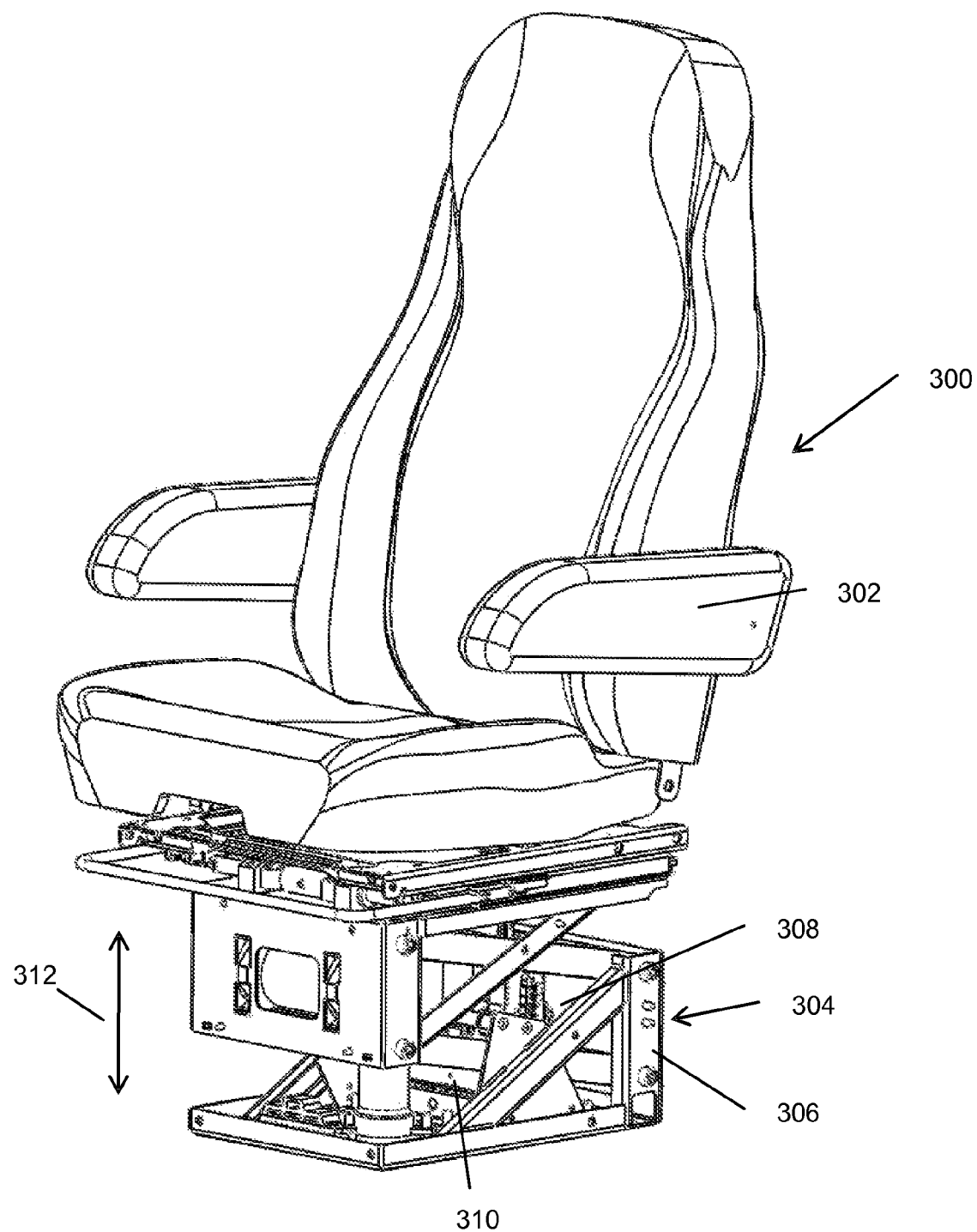
FIG. 8 shows an actively suspended seat.

An environment in which the invention can be used is shown in FIG. 8. This is a non-limiting embodiment of a positioning system with which the invention can be used. System 300 comprises vehicle seat 302 that is moved up and down vertically (in the direction of arrow 312) so as to counteract vibrations and other accelerations of seat 302. Active vertical seat suspension system 304 affects the motion of seat 302 relative to fixed base 306. Active suspension system 304 includes one or more actuators as integral parts thereof. The actuators are capable of generating forces whose magnitude and direction can be controlled independently of the position and motion of the suspension. In some embodiments, one actuator is an electromagnetic actuator such as an electromagnetic motor, either linear or rotary, single-phase or multiphase. In this example, actuator 308 is a multi-phase electromagnetic linear motor and actuator 310 is a single-phase force bias eliminator, which may be accomplished with an air cylinder.

Figure 9:
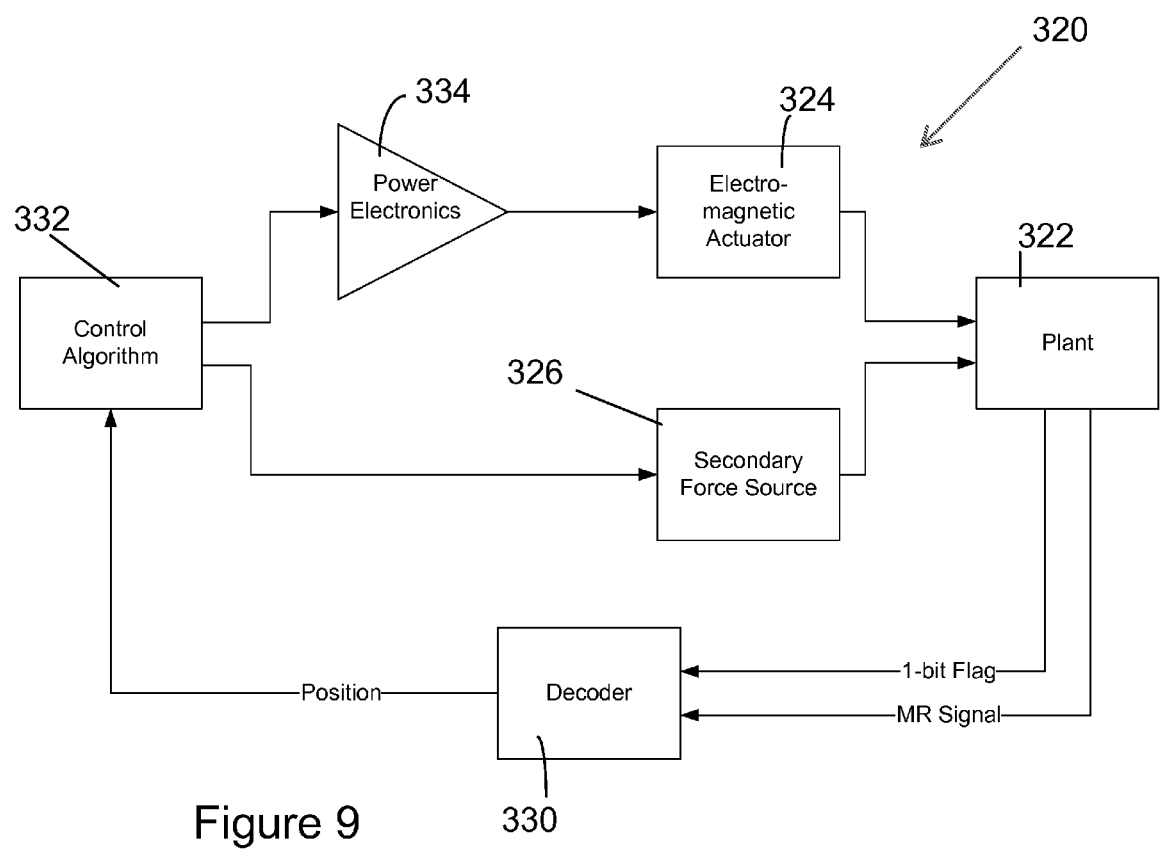
FIG. 9 is a schematic block diagram of a positioning system for an embodiment of the invention.

FIG. 9 shows a control and positioning system 320, which can be used for the actively suspended seat of FIG. 8. Control and positioning system 320 includes one actuator 326 designed and operated so as to eliminate force bias on movable portion or plant 322 (e.g., seat 302), and a second actuator 324 designed and operated so as to minimize accelerations on plant 322. The force bias eliminator 326 can be a single-phase actuator designed to eliminate the force bias so that the second actuator 324 that counteracts accelerations does not have to maintain a dc force. An example is an air cylinder that is inflated or deflated to change the position of the seat. An absolute position sensor and an incremental position sensor (neither shown in the drawing) sense the position of plant 322 and provide their outputs to decoder 330 which outputs the absolute position of plant 322. Control algorithm 332 develops appropriate control signals and provides them to actuator 324 (a linear motor) through power electronics 334, and to actuator 326 through pressurized air source 336. Actuator 324 is controlled so as to counteract seat accelerations.

System 320 is initialized as follows. The absolute position sensor is used to determine which half of the travel the armature (and thus seat) is in. The controller then causes the air cylinder to move the seat toward the home position, by either inflating or deflating the air cylinder as necessary. When the home position is sensed, the system is able to determine the absolute position of the seat.

Other implementations are within the scope of the following claims.

We claim:

1. An apparatus, comprising:
   a linear motor comprising a stator and an armature that is movable relative to the stator over a travel distance;
   a first magnetic device coupled to the armature, the first magnetic device defining a sensing surface that comprises a plurality of magnetic poles that provide a magnetization state transition location there between;
   a magnetic pole sensor coupled to the stator adjacent the first magnetic device such that the first magnetic device moves past the magnetic pole sensor as the armature moves relative to the stator over the travel distance, the magnetic pole sensor sensing the adjacent poles of the first magnetic device;
   a second magnetic device coupled to the armature, the second magnetic device defining a sensing surface that comprises a plurality of adjacent alternating opposite magnetic poles that create a cyclically-varying magnetic field proximate its sensing surface; and
   a magnetic field angle sensor coupled to the stator adjacent the second magnetic device such that the cyclically-varying magnetic field of the second magnetic device moves past the magnetic field angle sensor as the armature moves relative to the stator, the magnetic field angle sensor sensing the angle of the magnetic fields of the second magnetic device and having an output that varies continuously relative to the magnetic field angle over at least a portion of one cycle of the cyclically-varying magnetic field.

2. The apparatus of claim 1 wherein the magnetic pole sensor comprises a Hall sensor.

3. The apparatus of claim 2 wherein the magnetic field angle sensor comprises a magnetoresistive sensor.

4. The apparatus of claim 3 wherein the magnetic pole sensor comprise a bipolar Hall sensor and the magnetic field angle sensor has a full-scale output of 180° such that its output repeats twice for each magnetic field cycle of the second magnetic device.

5. The apparatus of claim 1 wherein the first magnetic device is at least half as long as the travel distance of the armature and the second magnetic device is at least as long as the travel distance of the armature.

6. The apparatus of claim 1 in which the adjacent poles of the second magnetic device meet at magnetization state transition locations, and wherein the first and second magnetic devices are coupled to the armature such that there is a known, defined spatial relationship between a magnetization state transition location of the first magnetic device and at least one magnetization state transition location of the second magnetic device.

7. The apparatus of claim 6 wherein the transition location of the first magnetic device is approximately centered relative to the length of the sensing surface of the second magnetic device.

8. The apparatus of claim 6 wherein the magnetic field angle sensor output resets at least one location over each magnetic field cycle, and wherein the first and second magnetic devices are arranged such that when the magnetic pole sensor is adjacent to a transition location of the first magnetic device, the magnetic field angle sensor is not adjacent to a location at which it resets.

9. The apparatus of claim 1 further comprising a third magnetic device coupled to the armature adjacent to the first magnetic device, the third magnetic device defining a sensing surface that defines a single magnetization state transition location over the armature travel distance, wherein the sensing surfaces of the first and third magnetic devices each comprise at least two magnetic poles, and wherein the adjacent magnetic poles of the first and third magnetic devices are of opposite polarity.

10. An apparatus, comprising:
a linear motor comprising a stator and an armature that is movable relative to the stator over a travel distance;
a first magnetic device coupled to the armature, the first magnetic device defining a sensing surface that comprises a plurality of magnetic poles that provide a magnetization state transition location there between;
a magnetic pole sensor coupled to the stator adjacent the first magnetic device such that the first magnetic device moves past the magnetic pole sensor as the armature moves relative to the stator over the travel distance, the magnetic pole sensor sensing the adjacent poles of the first magnetic device;
a second magnetic device coupled to the armature, the second magnetic device defining a sensing surface defining a sensing surface that is at least as long as the travel distance of the armature and that comprises a plurality of adjacent alternating opposite magnetic poles that create a cyclically-varying magnetic field proximate its sensing surface; and
a magnetic field angle sensor coupled to the stator adjacent the second magnetic device such that the cyclically-varying magnetic field of the second magnetic device moves past the magnetic field angle sensor as the armature moves relative to the stator, the magnetic field angle sensor sensing the angle of the magnetic fields of the second magnetic device and having an output that varies continuously relative to the magnetic field angle over at least a portion of one cycle of the cyclically-varying magnetic field;
wherein the adjacent poles of the second magnetic device meet at magnetization state transition locations, and wherein the first and second magnetic devices are coupled to the armature such that there is a known, defined spatial relationship between a magnetization state transition location of the first magnetic device and at least one magnetization state transition location of the second magnetic device, and wherein the magnetic field angle sensor output resets at one or two locations over each magnetic field cycle, and wherein the first and second magnetic devices are arranged such that when the magnetic pole sensor is adjacent to a transition location of the first magnetic device, the magnetic field angle sensor is not adjacent to a location at which it resets.

11. A sensing system that is used to determine the position of one or more relatively movable portions of an assembly that move over a travel distance, the sensor system comprising:
a first magnetic device coupled to a first portion of the assembly, the first magnetic device defining a sensing surface that comprises a plurality of magnetic poles that provide a magnetization state transition location there between;
an absolute position sensor coupled to a second portion of the assembly adjacent the first magnetic device and having a two-state output, wherein the output state changes when a magnetization state transition of the first magnetic device moves past the absolute position sensor as the portions move relative to one another over the travel distance;
a second magnetic device coupled to the first portion of the assembly, the second magnetic device creating a cyclically-varying magnetic field proximate its sensing surface; and
an incremental position sensor coupled to the second portion of the assembly adjacent the second magnetic device and having an output that repeats at least once for each cycle of the cyclically-varying magnetic field of the second magnetic device.

12. The sensor system of claim 11 wherein the absolute position sensor comprises a Hall sensor.

13. The sensor system of claim 12 wherein the incremental position sensor comprises a magnetic field angle sensor coupled to the second portion of the assembly such that as the cyclically-varying magnetic field of the second magnetic device moves past the magnetic field angle sensor the magnetic field angle sensor senses the angle of the magnetic fields of the second magnetic device and has an output that varies continuously relative to the magnetic field angle over at least a portion of one cycle of the cyclically-varying magnetic field.

14. The sensor system of claim 13 wherein the second magnetic device defines a sensing surface that comprises a plurality of adjacent alternating opposite magnetic poles that create the cyclically-varying magnetic field proximate its sensing surface.

15. The sensor system of claim 14 wherein the magnetic pole sensor comprises a bipolar Hall sensor and the magnetic field angle sensor has a full-scale output of 180° such that its output repeats twice for each magnetic field cycle of the second magnetic device.

16. The sensor system of claim 14 wherein the first magnetic device is at least half as long as the travel distance and the second magnetic device is at least as long as the travel distance.

17. The sensor system of claim 16 in which the adjacent poles of the second magnetic device meet at magnetization state transition locations, and wherein the first and second magnetic devices are coupled to the armature side-by-side such that there is a known, defined spatial relationship between the magnetization state transition location of the first magnetic device and adjacent predetermined magnetization state transition location of the second magnetic device.

18. The sensor system of claim 17 wherein the transition location of the first magnetic device is approximately centered relative to the length of the sensing surface of the second magnetic device.

19. The sensor system of claim 17 wherein the magnetic field angle sensor output resets at least one location over each magnetic field cycle, and wherein the first and second magnetic devices are arranged such that when the Hall sensor is adjacent to the transition location of the first magnetic device, the magnetic field angle sensor is not adjacent to a location at which it resets.

20. The sensor system of claim 17 further comprising a third magnetic device coupled to the first portion of the assembly alongside of the first magnetic device, the third magnetic device defining a sensing surface that defines a single magnetization state transition location over the travel distance, wherein the sensing surfaces of the first and third magnetic devices each comprise at least two magnetic poles, and wherein the adjacent magnetic poles of the first and third magnetic devices are of opposite polarity.

21. A control system that controls one or more actuators that move relatively movable portions of an assembly so as to control the position of the portions of the assembly, the control system comprising:
an absolute position sensor with a two-state output, one state indicative of a first part of the relative movement and the other state indicative of a second, different part of the relative movement;

an incremental position sensor with an output that varies continuously over at least a portion of each of a plurality of repeating cycles associated with the relative movement; and a controller that receives the outputs of both sensors;

wherein at start-up at least one of the portions of the assembly is moved until the output of the absolute position sensor changes state, and in response the controller determines the absolute positions of the portions of the assembly.

22. The control system of claim 21 wherein the controller tracks information indicative of the cycle currently being sensed by the incremental position sensor, and wherein after start-up, upon relative movement of the portions of the assembly the controller determines the absolute position of at least one of the portions of the assembly based on both an identification of which of the plurality of cycles is currently being sensed by the incremental position sensor, and the output of the incremental position sensor.

23. The control system of claim 22 wherein at start-up the controller determines the absolute positions of the portions of the assembly based at least in part on the identification of which of the plurality of cycles is currently being sensed by the incremental position sensor.

24. The control system of claim 22 wherein the total number of cycles is fixed, and the controller detects an error if the number of cycles that are tracked exceeds a predetermined number of cycles.

25. The control system of claim 23 wherein the absolute position sensor is used to confirm correct tracking of cycles.

26. The control system of claim 21 wherein the sensors are non-contact sensors.

27. The control system of claim 26 wherein the absolute position sensor comprises a Hall sensor, and the incremental position sensor comprises a magnetoresistive sensor.

28. A method of operating a control system that controls one or more actuators that move one or more relatively movable portions of an assembly so as to control the position of the portions of the assembly, the control system comprising: an absolute position sensor with a two-state output, one state indicative of a first part of the relative movement of the portions of the assembly and the other state indicative of a second, different part of the relative movement; an incremental position sensor with an output that varies continuously over at least a portion of each of a plurality of repeating cycles associated with the relative movement; and a controller that receives the outputs of both sensors and outputs a control signal, the method comprising:

causing the controller to output a signal that results in the movement of at least one portion of the assembly until the state of the absolute position sensor changes; and determining the absolute position of at least one of the portions of the assembly based on at least the output of the incremental position sensor.

29. The method of claim 28 wherein the controller tracks information indicative of the cycle currently being sensed by the incremental position sensor, and wherein upon relative movement of the portions of the assembly the controller determines the absolute position of at least one of the portions of the assembly based on both an identification of which of the plurality of cycles is currently being sensed by the incremental position sensor, and the output of the incremental position sensor.

30. The method of claim 29 wherein the total number of cycles is fixed, and the controller detects an error if the number of cycles that are tracked exceeds a predetermined number of cycles.

31. The method system of claim 29 wherein the absolute position sensor is used to confirm correct tracking of cycles.

32. A positioning system for positioning a movable portion of an assembly relative to another portion of the assembly, comprising:

an electromagnetic motor comprising a stator, and an armature that is coupled to the movable portion of the assembly and is movable relative to the stator over a travel distance;

a single-phase actuator coupled to the movable portion of the assembly;

a first magnetic device coupled to the armature, the first magnetic device defining a sensing surface that comprises a plurality of magnetic poles that provide a magnetization state transition location there between;

a magnetic pole sensor with a two-state output, the magnetic pole sensor coupled to the stator adjacent the first magnetic device such that the first magnetic device moves past the magnetic pole sensor as the armature moves relative to the stator over the travel distance, wherein one state of the magnetic pole sensor output is indicative of a first part of the relative movement and the other state is indicative of a second, different part of the relative movement;

a second magnetic device coupled to the armature, the second magnetic device defining a sensing surface that comprises a plurality of adjacent alternating opposite magnetic poles that create a cyclically-varying magnetic field proximate its sensing surface;

a magnetic field angle sensor coupled to the stator adjacent the second magnetic device such that the cyclically-varying magnetic field of the second magnetic device moves past the magnetic field angle sensor as the armature moves relative to the stator, the magnetic field angle sensor sensing the angle of the magnetic fields of the second magnetic device and having an output that varies continuously relative to the magnetic field angle over at least a portion of each of a plurality of cycles of the cyclically-varying magnetic field; and a controller that is responsive to both sensors, and controls the single-phase actuator to move the movable portion of the assembly until the output of the magnetic pole sensor changes state, and in response to the state change the controller determines the absolute position of at least one of the portions of the assembly.

33. The positioning system of claim 32 wherein the electromagnetic motor comprises a linear multi-phase electromagnetic motor and the single-phase actuator comprises an air cylinder.

34. The positioning system of claim 33 wherein the controller tracks information indicative of the cycle currently being sensed by the magnetic field angle sensor, and wherein upon relative movement of the portions of the assembly the controller determines the absolute position of at least one of the portions of the assembly based on both an identification of which of the plurality of cycles is currently being sensed by the magnetic field angle sensor, and the output of the magnetic field angle sensor.

35. The positioning system of claim 34 wherein the magnetic pole sensor comprises a Hall sensor and the magnetic field angle sensor comprises a magnetoresistive sensor.

36. The positioning system of claim 35 wherein the movable portion comprises a seat in a motor vehicle.

* * * * *